June 17, 1941. T. W. ROLPH 2,246,320
LUMINAIRE
Filed Aug. 6, 1938 3 Sheets-Sheet 1
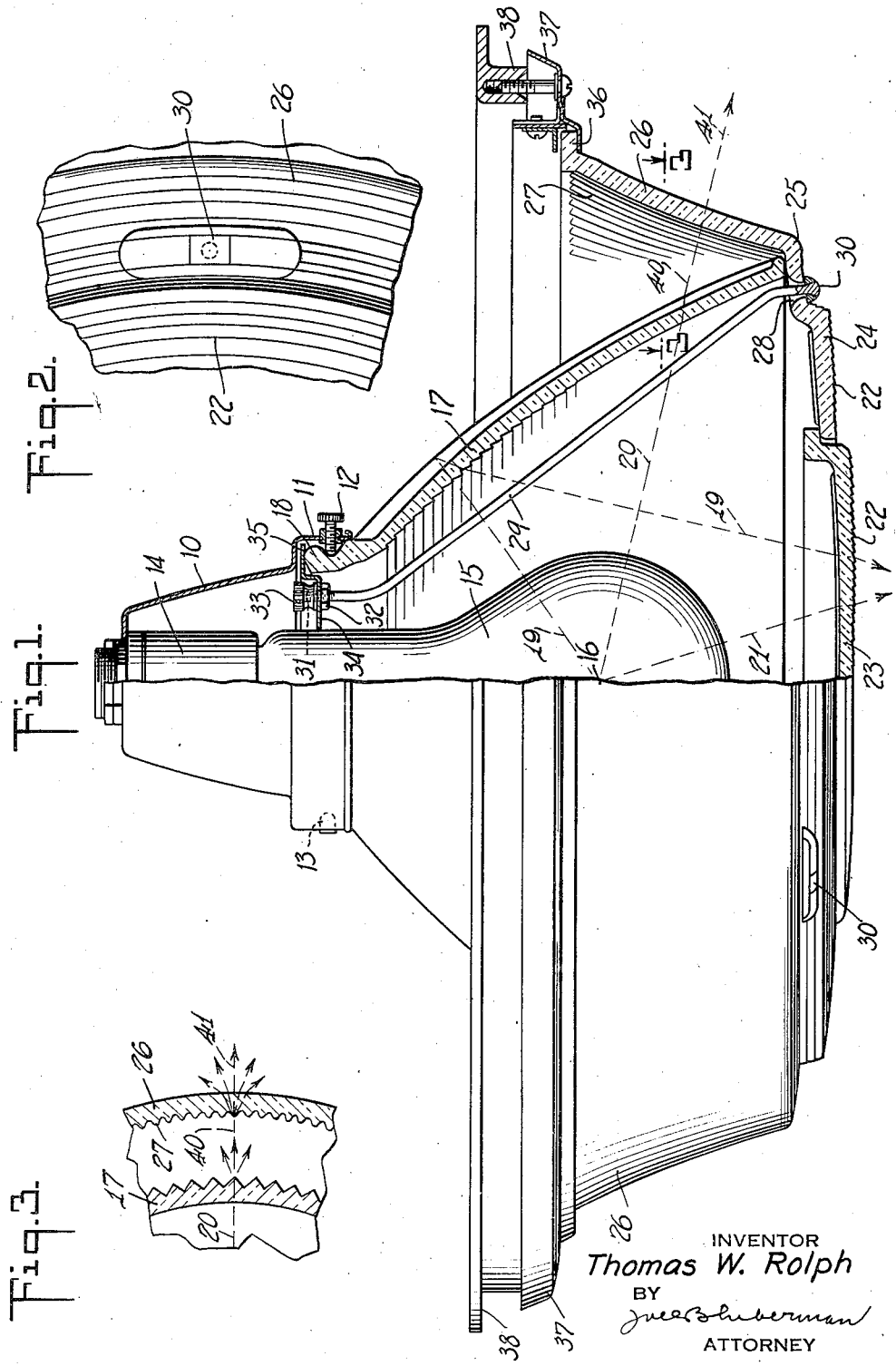
INVENTOR
Thomas W. Rolph
BY
ATTORNEY June 17, 1941. T. W. ROLPH 2,246,320
LUMINAIRE
Filed Aug. 6, 1938 3 Sheets-Sheet 2
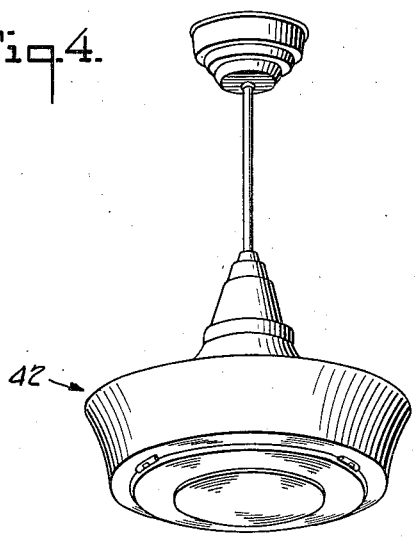
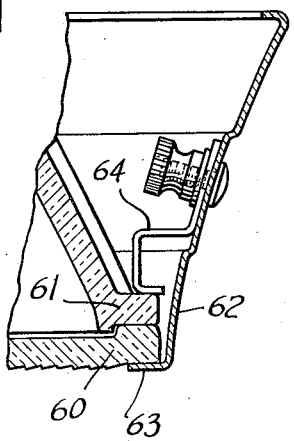
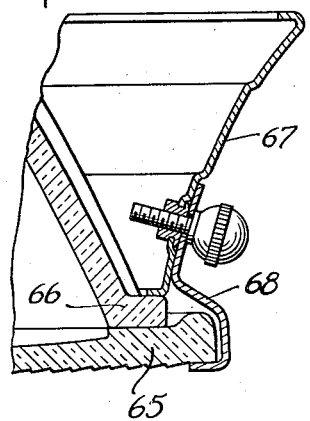
INVENTOR
Thomas W. Rolph
BY
ATTORNEY

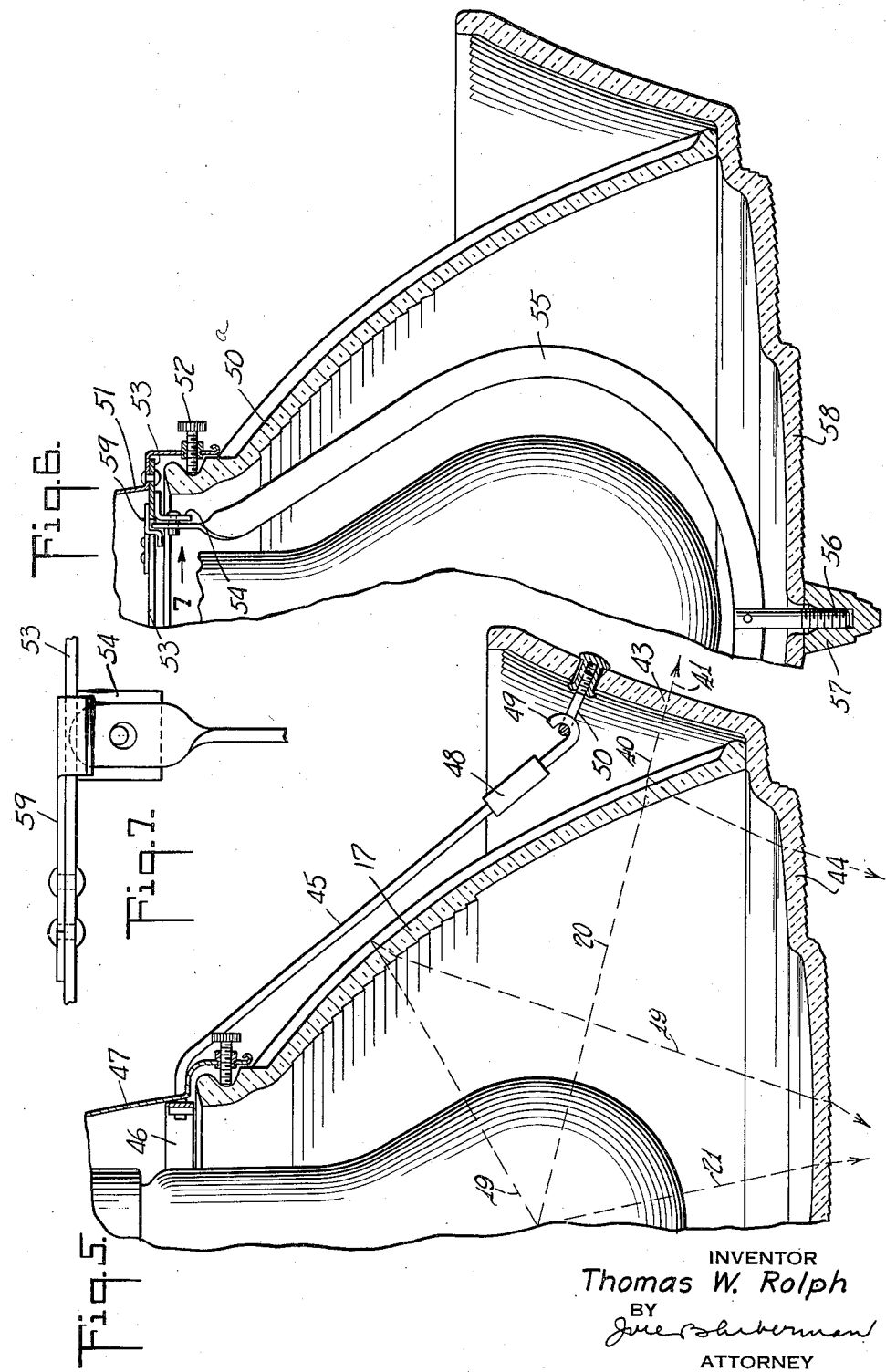

Patented June 17, 1941

2,246,320

UNITED STATES PATENT OFFICE 2,246,320

LUMINAIRE

Thomas W. Rolph, Newark, Ohio, assignor to Holophane Company, Inc., New York, N. Y., a corporation of Delaware Application August 6, 1938, Serial No. 223,437

7 Claims. (Cl. 240—93)

The present invention relates to luminaires, and is more particularly directed toward direct lighting luminaires wherein translucent reflectors are surrounded by a light shield which screens the bright surface of the lower part of the reflector.

Reflectors employing reflecting prisms for redirecting the light transmit a small portion of the light through the transparent medium, so that such prismatic reflectors appear bright. Where a comparatively high intensity light source is employed the surface brightness of the prismatic reflector is very much higher in a radial band running up and down through the center of the reflector than it is towards the sides of the reflector. This comes from the fact that the light source is never a point and some of the light rays do not strike the surfaces at the angle of total reflection. It also comes from the absence of complete lateral diffusion in the refracting medium.

According to the present invention the prismatic reflector is surrounded by a light shield which in some cases may be metal, although it is preferably made of translucent material which may well take the form of etched crystal glass having light diffusing flutes, each of which picks up and scatters light rays passing through numerous reflecting prisms, so that the screen has a low brightness well distributed over its entire projected area.

The present invention also contemplates that the reflector mouth will be covered by a light transmitting closure which screens the source, and this closure is preferably made of prismatic material having a formation co-operating with the reflector to produce a desired distribution of downward light, so that one can obtain a desirable spread of direct light with low brightness in the parts exposed to view.

A further object of the present invention is to design the light controlling parts for convenient assembly and ease of hanging them on a pendent support or securing the same to the ceiling with the light shield exposed.

The accompanying drawings show, for purposes of illustrating the present invention, several embodiments in which the invention may take form, it being understood that the drawings are illustrative of the invention rather than limiting the same.

In these drawings:

Figure 1 is an elevational view with parts in section showing a complete assembled luminaire designed for ceiling mounting;

Figure 2 is an inverted fragmentary view showing a detail;

Figure 3 is a fragmentary sectional view taken on the broken line 3—3 of Figure 1;

Figure 4 is a perspective view of a pendent luminaire;

Figure 5 is a sectional view illustrating a modified form of construction;

Figure 6 is a fragmentary sectional view illustrating a further modified form of construction;

Figure 7 is a fragmentary view taken in the direction of the arrow 7 of Figure 6; and Figures 8 and 9 are fragmentary views showing still further modified forms of construction.

A fitter 10 is provided with a skirt 11 to accommodate the usual shade supporting screws 12 and lugs 13. It also carries a lamp socket 14 which supports a lamp bulb 15 having its light center at 16.

The lamp is received within a prismatic reflector 17 having a heel 18 adapted to be secured in place by the screws and lugs 12 and 13. The reflector 17 acts on light rays, such as 19, reflecting them downwardly, as indicated. These reflected rays, as well as the direct rays such as 21, pass through prisms 22 of a closure and the light is distributed downwardly. The closure on which the prism system 22 is imposed comprises a disk 23 and an annular portion 24, the latter forming a part of a single piece of glass 25 which has an upwardly and outwardly flaring portion, indicated at 26, forming a light shield. This portion 26 is provided with diffusing flutes 27, shown more clearly in Figure 3.

The glass piece 25 is provided with three apertures, indicated at 28, to receive rods 29 having supports 30 underneath the glass piece 25 and threaded upper ends 31 to receive lock nuts 32 and thumb nuts 33. The rods 29 pass through a clamping ring 34 which extends out over the heel 18 of the reflector, as indicated at 35. These rods and clamping ring make it possible to secure the parts 17 and 25 together as a unit. The disk 23 is downwardly removable to facilitate relamping.

The periphery of the screen element 26 is provided with a flange, indicated at 36, adapted to be received in a ceiling ring 37 suitably secured to a support, for example, a plaster ring indicated at 38. The fixture shown in Figure 1 is therefore adapted for mounting in the ceiling with the screen 26 below the ceiling height and the remainder of the luminaire recessed.

Light rays, such as ray 20, striking the lower part of the reflector 17 will be partially transmitted through the glass, as indicated by the rays 40. It is characteristic of reflecting prisms as ordinarily employed, that the transmitted light is not of the same intensity in all directions and hence the view from without shows strong brightness contrasts. The dominant transmitted light proceeds in the radial plane or at angles slightly divergent from the radial plane, so that this part of the reflector would appear bright. These rays, however, do not reach the eye directly but pass through the diffusing flutes 27 and are scattered as indicated by the rays 41 of Figure 3. In this way the entire projected area of the light shield 26 appears luminous but has a low and well distributed brightness.

Figure 4 shows a luminaire 42 designed for pendent mounting. It employs the same optical parts as shown in Figure 1, except that the flange 36 is omitted.

In the construction shown in Figure 5 the parts are optically the same as shown in Figure 1, except that they are made up in two pieces of glass instead of three. Here the screen 43 and the closure 44 are made in a single piece and the closure has no removable disk. The parts are clamped together by rods 45 anchored to a ring 46 in the fitter 47 and connected by a tension device, indicated at 48, with hooks 49. These hooks are received in loops 50 secured to the screen member 43. With this form of construction it is necessary to disconnect the hooks so as to lower the glass piece 43—44 for relamping.

In the arrangement shown in Figures 6 and 7 the reflector 50a is supported from the heel of the fitter 51 by screws 52 in the usual manner. The fitter 51 carries a ring 53 to which is secured two lugs 54, these lugs pivotally support a harp 55 having a threaded stem 56 to accommodate a nut 57 whereby the closure 58 may be clamped up against the bottom of the reflector. This harp is biased to the center position by springs 59 carried by the ring 53.

In the arrangement shown in Figure 8 the closure is in the form of a prismatic plate of desired configuration and has a periphery, indicated at 60, which engages the flange 61 on the bottom of the reflector. The light shield 62 is in the form of a band, which may be made of metal or suitable translucent material such as plastic, having a bottom flange 63 which extends under the plate 60 and carrying removable clips 64 adapted to engage the top of the flange 61.

The arrangement shown in Figure 9 differs from that shown in Figure 8 in that the closure 65 is somewhat larger in diameter than the reflector flange 66, so that some light will be transmitted outwardly and upwardly to light the shield, which in this instance would be opaque.

The parts are held together by clips indicated at 68.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. A direct lighting luminaire comprising a light source, an open mouthed light transmitting reflector adapted to direct the reflected light downwardly through its mouth, the reflector extending down a substantial distance below the light source and having a light transmitting characteristic below the horizontal plane through the light source to present a region of high brightness, a light transmitting and modifying closure screen for the bottom of the reflector which transmits the direct and reflected light and screens the source, and a light shield disposed along the length of the lower edge of the reflector and extending upwardly from said edge of the reflector, terminating at a level substantially that of the light source and diverging from the reflector profile, the shield receiving light from the source only by transmission through the reflector walls and screening the bright surfaces of said walls when viewed from below the horizontal, light emitted from the outside of the reflector above the horizontal plane through the light source escaping above the light shield.

2. A luminaire such as claimed in claim 1, wherein the light shield and at least a part of the closure are in a single piece.

3. A luminaire such as claimed in claim 1, wherein the light shield and at least a part of the closure are in a single piece, and having a clamping ring at the top of the reflector and tension members connecting the ring and said piece.

4. A luminaire such as claimed in claim 1, wherein the reflector is prismatic and in which the said region of high brightness is characterized by strong brightness contrasts.

5. A luminaire such as claimed in claim 1, wherein the reflector is annular and the closure is prismatic to control the light transmitted through it and comprises a peripheral annular portion and a central removable disk.

6. A luminaire such as claimed in claim 1, wherein the light shield is light transmitting and diffusing.

7. A luminaire such as claimed in claim 1, wherein the closure is prismatic to control the light transmitted through it, and wherein the light shield is light transmitting and diffusing and is provided with vertical diffusing flutes.

THOMAS W. ROLPH.